United States Patent
Shibahara et al.

(10) Patent No.: US 11,888,584 B2
(45) Date of Patent: Jan. 30, 2024

(54) OPTICAL TRANSMISSION SYSTEM, OPTICAL TRANSMISSION APPARATUS AND OPTICAL TRANSMISSION METHOD

(71) Applicant: NIPPON TELEGRAPH AND TELEPHONE CORPORATION, Tokyo (JP)

(72) Inventors: Koki Shibahara, Musashino (JP); Takayuki Mizuno, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/800,195

(22) PCT Filed: Feb. 18, 2020

(86) PCT No.: PCT/JP2020/006263
§ 371 (c)(1),
(2) Date: Aug. 16, 2022

(87) PCT Pub. No.: WO2021/166071
PCT Pub. Date: Aug. 26, 2021

(65) Prior Publication Data
US 2023/0054203 A1    Feb. 23, 2023

(51) Int. Cl.
*H04J 14/04*    (2006.01)
*H04B 10/2581*    (2013.01)

(52) U.S. Cl.
CPC .......... *H04J 14/04* (2013.01); *H04B 10/2581* (2013.01)

(58) Field of Classification Search
CPC .............................. H04J 14/04; H04B 10/2581
(Continued)

(56) References Cited

U.S. PATENT DOCUMENTS

2014/0219657 A1*  8/2014  Simonneau ............. H04J 14/02
                                                        398/49
2015/0043910 A1*  2/2015  Koebele ............. H04B 10/2581
                                                        398/44
(Continued)

FOREIGN PATENT DOCUMENTS

EP            2725729 A1 *  4/2014  ......... H04B 10/2581
JP         2013214852 A  * 10/2013
WO   WO-2019171953 A1 *  9/2019  ............. G11B 27/13

OTHER PUBLICATIONS

M. Filer and S. Tibuleac, N-degree ROADM Architecture Comparison: Broadcast-and-Select versus Route-and-Select in 120Gb/s DP-QPSK Transmission Systems, OFC 2014, Mar. 9, 2014.

(Continued)

*Primary Examiner* — Abbas H Alagheband
(74) *Attorney, Agent, or Firm* — Harness, Dickey & Pierce, P.L.C.

(57) ABSTRACT

An optical transmission system includes a plurality of transmission lines through which a mode-multiplexed signal obtained by multiplexing a plurality of optical signals of different types of modes is transmitted, and one or more mode group permutation units provided between the plurality of transmission lines. The mode group permutation unit changes, on a mode-group-by-mode-group basis, an optical signal of a mode belonging to a mode group to an optical signal of another mode belonging to a mode group after permutation corresponding to the mode group in such a manner that modes are interchanged between at least some of the plurality of optical signals multiplexed into the mode-multiplexed signal input from one of the plurality of transmission lines on an input side, and outputs the mode-multiplexed signal after mode interchange to one of the plurality of transmission lines on an output side.

7 Claims, 11 Drawing Sheets

(58) Field of Classification Search
USPC .......................................................... 398/44
See application file for complete search history.

(56) References Cited

U.S. PATENT DOCUMENTS

| | | | | |
|---|---|---|---|---|
| 2015/0098697 | A1* | 4/2015 | Marom | G02B 6/2848 |
| | | | | 398/44 |
| 2016/0043826 | A1* | 2/2016 | Zhou | H04J 14/02 |
| | | | | 398/44 |
| 2016/0231503 | A1* | 8/2016 | Sillard | G02B 6/03627 |
| 2017/0195052 | A1* | 7/2017 | Awwad | H04J 14/04 |
| 2017/0302398 | A1* | 10/2017 | Yin | G02B 6/38 |
| 2018/0019817 | A1* | 1/2018 | Rekaya Ben-Othman | |
| | | | | H04B 10/60 |
| 2018/0175937 | A1* | 6/2018 | Yang | H04B 10/2581 |

OTHER PUBLICATIONS

Brandon Collings, New Devices Enabling Software-Defined Optical Networks, IEEE Communications Magazine, Mar. 2013, pp. 66-71.

* cited by examiner

OPTICAL TRANSMISSION SYSTEM, OPTICAL TRANSMISSION APPARATUS AND OPTICAL TRANSMISSION METHOD

CROSS-REFERENCE TO RELATED APPLICATIONS

This application is a 371 U.S. National Phase of International Application No. PCT/JP2020/006263, filed on Feb. 18, 2020. The entire disclosure of the above application is incorporated herein by reference.

TECHNICAL FIELD

The present invention relates to an optical transmission system, an optical transmission apparatus, and an optical transmission method.

BACKGROUND ART

With the prevalence of smartphones in recent years, development of high definition video service distribution and Internet of things (IoT) services, and the like, communication traffics flowing through optical networks have been on the rise yearly. In optical networks, increasing communication traffic demands have been dealt with by, for example, increasing functionality of optical communication system apparatuses installed in terminal stations of optical networks and introducing optical amplifiers and optical switches without changing a structure of an optical fiber as a transmission line (for example, see NPLs 1 and 2).

A single-mode fiber is used as an optical fiber underlying the current large-capacity optical networks except for a local network for near-field purposes such as a local area network (LAN). The single-mode fiber is a fiber having, in a clad, a single core that is a path for an optical signal. The single-mode fiber permits only single mode propagation for a wavelength band such as C-band, or L-band used in the large-capacity optical networks. Such a single-mode fiber enables a large-capacity optical network that stably transfers information of several terabits per second over a long distance.

Furthermore, a digital coherent transmission technique in which a digital signal processing technique and a coherent transmission/reception technique are combined has already been commercially introduced to a 100 gigabit-grade optical transmission apparatus. When the digital coherent transmission technique is used, it is possible not only to improve a reception sensitivity by coherent reception, but also to retrieve information placed independently on an amplitude and a phase of an optical carrier and correct a waveform distortion caused during transmission with high accuracy.

Simple examples include polarization multiplexed optical transmission using two modes of orthogonal polarizations in a single-mode fiber. In the polarization multiplexed optical transmission, a different piece of information can be placed on each of orthogonal polarizations. These polarizations are complexly mixed in an optical transmission line. In addition, the orthogonal axes of these polarization modes vary at a high speed, and thus it is generally difficult to track the orthogonal axes using an optical device. A reception apparatus compatible with a polarization diversity structure receives a polarization multiplexed optical signal obtained by mixing the polarizations, converts it into a digital signal, and uses digital signal processing to separate the signal. The above processing can be modeled as a 2×2 multiple-input multiple-output (MIMO) system used in a wireless communication system. From the signals obtained by the separation, information is retrieved for each of the polarizations, and communication is established between a transmitter and a receiver.

Another example is mode-multiplexed optical transmission using a plurality of modes in a multi-mode fiber. In the mode-multiplexed optical transmission, by increasing a core diameter in comparison to that of the single-mode fiber, it is possible to excite a plurality of modes also in an existing wavelength band such as C-band, and further to place a different piece of information on each of the modes. In the case of the mode-multiplexed optical transmission as well, as in the case of the polarization multiplexed optical transmission, mode signals are complexly mixed during propagation of the mode-multiplexed optical signal through the multi-mode fiber. A reception apparatus compatible with the mode diversity structure receives the mode-multiplexed optical signal obtained by mixing the mode signals, converts it into a digital signal, and uses digital signal processing to separate the signal.

As a more specific example, a few-mode fiber that excites two linearly polarized (LP) modes is considered. In the few-mode fiber for 2 LP modes, an LP01 mode serving as a fundamental mode and an LP11 mode serving as a high-order mode are excited. Further, when two degenerate modes in the LP11 mode (which will be referred to as LP11a and LP11b) and polarization modes of each of the modes (which will be referred to as X polarization and Y polarization) are utilized, it is possible to place a different piece of information on each of total 6 spatial modes of LP01X, LP01Y, LP11aX, LP11aY, LP11bX, LP11bY in the few-mode fiber for 2 LP modes. As a result, when a non-linear optical effect of an optical fiber is neglected, the few-mode fiber for 2 LP modes can achieve a transmission capacity that is three times that of the existing single-mode fiber in principle.

CITATION LIST

Non Patent Literature

NPL 1: M. Filer and S. Tibuleac, "N-degree ROADM Architecture Comparison: Broadcastand-S elect versus Route-and-Select in 120 Gb/s DP-QPSK Transmission Systems", Th1I.2, OFC 2014.

NPL 2: Brandon Collings, "New Devices Enabling Software-Defined Optical Networks", NEW PARADIGMS IN OPTICAL COMMUNICATIONS AND NETWORKS, IEEE Communications Magazine, pp. 66-71, March 2013.

SUMMARY OF THE INVENTION

Technical Problem

However, in the mode-multiplexed transmission in which a multi-mode fiber or a few-mode fiber is used as a transmission medium and an independent signal is placed on each spatial mode, a signal pulse energy is diffused in a time direction due to a mode dispersion phenomenon. This is a major problem when a distance for signal transmission increases. The mode dispersion occurs due to a difference in propagation constant inherent in spatial modes. In other words, the mode dispersion is a phenomenon that essentially occurs in a multi-mode fiber or a few-mode fiber. Pulse broadening caused by the mode dispersion can be corrected in principle by using coherent reception and MIMO signal processing. However, in an optical communication requiring several tens of gigabits transmission per second, such correction is difficult to achieve because it greatly exceeds a realistic processing capability (clock speed, circuit scale) of a signal processing processor such as a large scale integrated circuit (LSI).

Furthermore, the mode dispersion phenomenon becomes more pronounced when a high-order mode is utilized, and thus forms a barrier in putting a mode-multiplexed transmission system to practical use. A refractive index distribution design can reduce an influence of the mode dispersion to some extent. However, it is difficult to design and fabricate a fiber that achieves both mode dispersion reduction in a broadband communication wavelength band (C-band, L-band) and mode dispersion reduction for all modes from the fundamental mode to high-order modes.

In view of the above circumstances, an object of the present invention is to provide an optical transmission system, an optical transmission apparatus, and an optical transmission method that are capable of reducing an influence of mode dispersion in mode-multiplexed transmission of optical signals.

Means for Solving the Problem

An aspect of the present invention is an optical transmission system including: a plurality of transmission lines through which a mode-multiplexed signal obtained by multiplexing a plurality of optical signals of different types of modes is transmitted; and one or more mode group permutation units provided between the plurality of transmission lines, wherein each of the one or more mode group permutation units changes, on a mode-group-by-mode-group basis, an optical signal of a mode belonging to a mode group to an optical signal of another mode belonging to a mode group after permutation corresponding to the mode group in such a manner that the modes are interchanged between at least some of the plurality of optical signals multiplexed into the mode-multiplexed signal input from one of the plurality of transmission lines on an input side, and outputs the mode-multiplexed signal after mode interchange to one of the plurality of transmission lines on an output side.

An aspect of the present invention is an optical transmission apparatus including a mode group permutation unit configured to receive a mode-multiplexed signal obtained by multiplexing a plurality of optical signals of different types of modes from a transmission line on an input side, changes, on a mode-group-by-mode-group basis, an optical signal of a mode belonging to a mode group to an optical signal of another mode belonging to a mode group after permutation corresponding to the mode group in such a manner that the modes are interchanged between at least some of the plurality of optical signals multiplexed into the received mode-multiplexed signal, and outputs the mode-multiplexed signal after mode interchange to a transmission line on an output side.

One aspect of the present invention is an optical transmission method in an optical transmission system including a plurality of transmission lines through which a mode-multiplexed signal obtained by multiplexing a plurality of optical signals of different types of modes is transmitted, and one or more mode group permutation units provided between the plurality of transmission lines, the optical transmission method including: by each of the one or more mode group permutation units, changing, on a mode-group-by-mode-group basis, an optical signal of a mode belonging to a mode group to an optical signal of another mode belonging to a mode group after permutation corresponding to the mode group in such a manner that the modes are interchanged between at least some of the plurality of optical signals multiplexed into the mode-multiplexed signal input from one of the plurality of transmission lines on an input side, and outputting the mode-multiplexed signal after mode interchange to one of the plurality of transmission lines on an output side.

Effects of the Invention

According to the present invention, it is possible to reduce an influence of mode dispersion in mode-multiplexed transmission of optical signals.

DESCRIPTION OF EMBODIMENTS

Hereinafter, embodiments of the present invention will be described in detail with reference to the drawings.

First Embodiment

Figure 1:
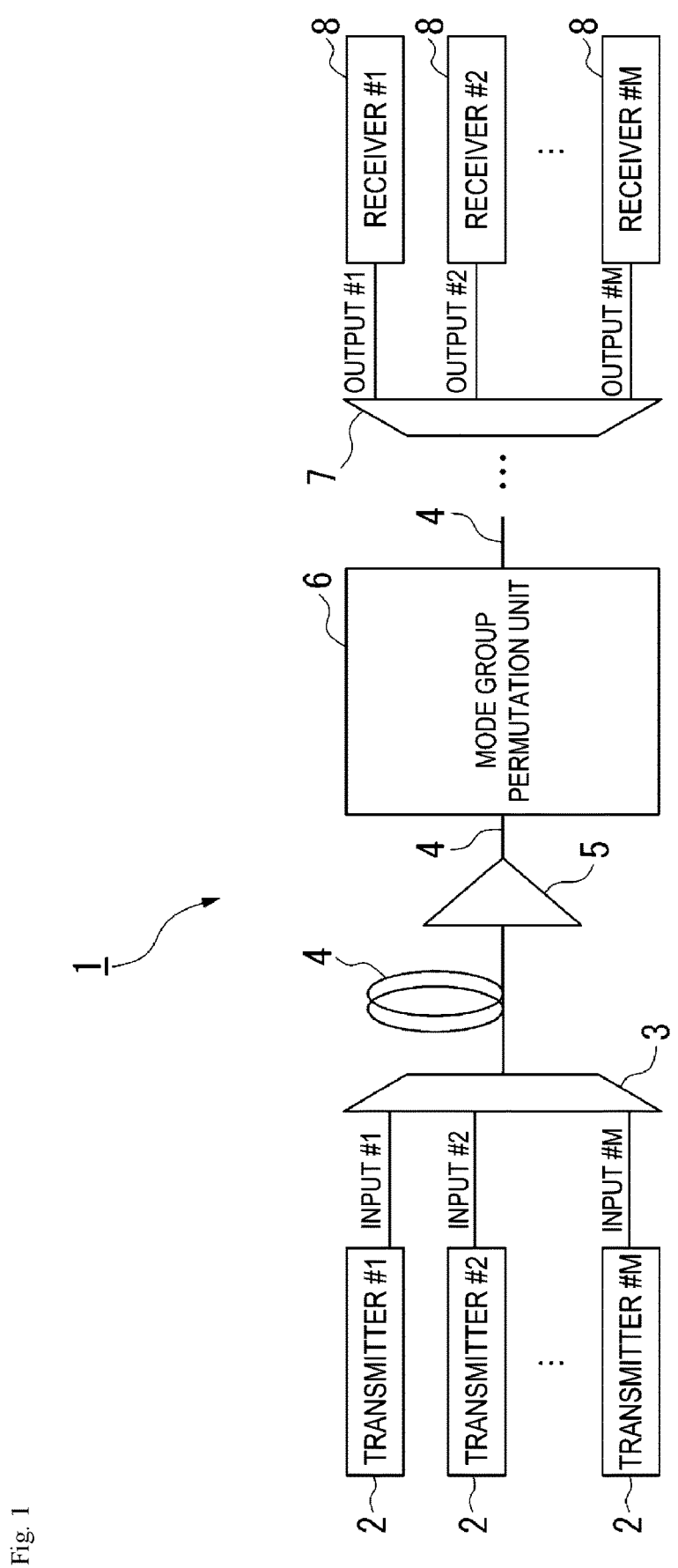
FIG. 1 is a configuration diagram of a multi-mode optical fiber system according to a first embodiment of the present invention.

FIG. 1 is a configuration diagram of a multi-mode optical fiber system 1 according to a first embodiment of the present invention. The multi-mode optical fiber system 1 includes a transmitter 2, a mode multiplexer/demultiplexer 3, a multi-mode optical amplifier 5, a mode group permutation unit 6, a mode multiplexer/demultiplexer 7, and a receiver 8. The multi-mode optical fiber system 1 includes M transmitters 2 and M receivers 8 (M is an integer of 1 or more). In FIG. 1, the m-th transmitter 2 and the m-th receiver 8 (m is an integer of 1 or more and M or less) are described as a transmitter #m and a receiver #m, respectively. The mode group permutation unit 6 is an example of an optical transmission apparatus.

The multi-mode optical fiber system 1 includes one or more multi-mode optical amplifiers 5 and one or more mode group permutation units 6 between the mode multiplexer/demultiplexer 3 and the mode multiplexer/demultiplexer 7. Although a case in which one mode group permutation unit 6 is connected to a subsequent stage of one multi-mode optical amplifier 5 is illustrated in FIG. 1, two or more multi-mode optical amplifiers 5 may be sequentially connected, and two or more mode group permutation units 6 may be sequentially connected. The multi-mode optical amplifier 5 and the mode group permutation unit 6 each are connected to an adjacent device by a multi-mode fiber 4. The adjacent device is the mode multiplexer/demultiplexer 3, the multi-mode optical amplifier 5, the mode group permutation unit 6, or the mode multiplexer/demultiplexer 7. One span is from the multi-mode fiber 4 connected to the mode multiplexer/demultiplexer 3 or the mode group permutation unit 6 to the next mode group permutation unit 6.

For example, a broadcast & select (B&S) switch can be used as the mode group permutation unit 6. The B&S switch has a configuration in which an optical splitter on a transmission side and an N×1 wavelength selective switch on a reception side are paired. Alternatively, for example, a route & select (R&S) switch can be used as the mode group permutation unit 6. The R&S switch has a configuration in which a 1×N wavelength selective switch on a transmission side and an N×1 wavelength selective switch on a reception side are paired.

The multi-mode fiber 4 is an example of the transmission line. The multi-mode fiber 4 is, for example, an optical fiber having a single core. The multi-mode fiber 4 excites M modes in a wavelength band used. The transmitter #1 to the transmitter #M each convert an independent data sequence to be input to each mode into a single mode optical signal. An optical signal input from the transmitter #m (m is an integer of 1 or more and M or less) to the mode multiplexer/demultiplexer 3 in a single mode is described as an input #m. An input #1 to an input #M are input to the mode multiplexer/demultiplexer 3 from the transmitter #1 to the transmitter #M, respectively.

The mode multiplexer/demultiplexer 3 outputs a mode-multiplexed signal obtained by multiplexing the input #1 to the input #M with different types of modes. The mode-multiplexed signal output from the mode multiplexer/demultiplexer 3 is input to the multi-mode fiber 4. The multi-mode optical amplifier 5 compensates for an attenuation of an optical power of the mode-multiplexed signal caused during transmission through the multi-mode fiber 4 by way of an optical amplification process. The compensated mode-multiplexed signal is input to the mode group permutation unit 6.

The mode group permutation unit 6 interchanges modes between at least some of the plurality of optical signals multiplexed into the mode-multiplexed signal input from the multi-mode fiber 4 on an input side. At this time, for each mode group, the mode group permutation unit 6 interchanges modes between at least some of the optical signals of modes belonging to the mode group. The mode group permutation unit 6 outputs the mode-multiplexed signal after mode interchange to the multi-mode fiber 4 on an output side.

Figure 2:
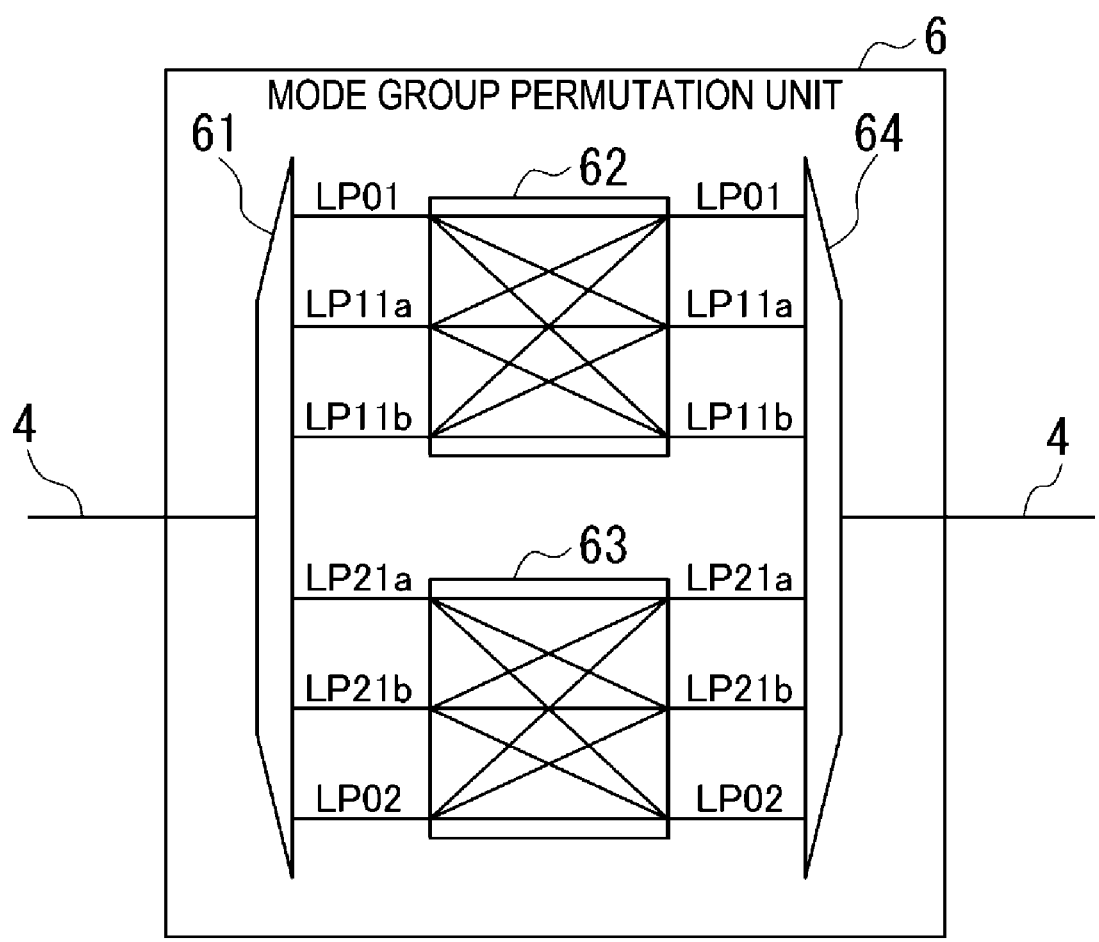
FIG. 2 is a configuration diagram of a mode group permutation unit according to the first embodiment.

An operation of the mode group permutation unit 6 will be described with reference to FIG. 2. FIG. 2 is a configuration diagram of the mode group permutation unit 6. The mode group permutation unit 6 includes an input-side mode multiplexer/demultiplexer 61, a first mode group permutation device 62, a second mode group permutation device 63, and an output-side mode multiplexer/demultiplexer 64. FIG. 2 illustrates a case in which M is 6. When M is 6, the multi-mode optical fiber system 1 corresponds to a polarization-multiplexed mode multiplexing system using a few-mode fiber for 4 LP modes. Then, when M is 6, the number of spatial modes excited in the multi-mode fiber 4 is 6. The six spatial modes are LP01, LP11a, LP11b, LP211a, LP21b, LP02. That is, different spatial modes of LP01, LP11a, LP11b, LP211a, LP21b, LP02 are used for the input #1 to the input #6 output from the mode multiplexer/demultiplexer 3, respectively. These six spatial modes are divided into three mode groups: a mode group 1 of LP01, a mode group 2 composed of LP11a and Lp11b, and a mode group 3 composed of LP21a, LP21b, and LP02.

The input-side mode multiplexer/demultiplexer 61 converts a mode-multiplexed signal input from the multi-mode fiber 4, which is a few-mode fiber, to a fundamental mode for each of the spatial modes. Subsequently, the first mode group permutation device 62 and the second mode group permutation device 63 perform permutation for each of spatial channel signals. If combinations of spatial modes for permutation are not limited, then the number of combinations is up to 6!, which is equal to 720, and the number of wiring lines to be required is 6×6, which is equal to 36.

In the present embodiment, the spatial modes are divided into mode groups, and combinations of spatial modes for permutation are limited to combinations in each of the mode groups. In the present embodiment, two mode groups are defined: a low-order mode group composed of LP01, LP11a, and LP11b and a high-order mode group composed of LP21a, LP21b, and LP02. The first mode group permutation device 62 performs given permutation of the spatial modes for the low-order mode group. On the other hand, the second mode group permutation device 63 performs given permutation of the spatial modes for the high-order mode group. As a result, the number of combinations for permutation is 3!^2, which is equal to 36, and the number of wiring lines in the mode group permutation unit 6 obtained by adding the number of wiring lines in the first mode group permutation device 62 and the number of wiring lines in the second mode group permutation device 63 is 2×3×3, which is equal to 18. Thus, the mode group permutation unit 6 can be downsized. Note that the combinations for permutation include a combination including one or more conversions in which a spatial mode is identical before and after conversion.

The first mode group permutation device 62 and the second mode group permutation device 63 each output optical signals of spatial modes after permutation to the output-side mode multiplexer/demultiplexer 64. The output-side mode multiplexer/demultiplexer 64 mode-multiplexes optical signals of LP01, LP11a, and LP11b output from the first mode group permutation device 62 and optical signals of LP21a, LP21b, and LP02 output from the second mode group permutation device 63. The output-side mode multiplexer/demultiplexer 64 inputs a mode-multiplexed signal obtained by mode multiplexing to the multi-mode fiber 4 which is a few-mode fiber between the output-side mode multiplexer/demultiplexer 64 and a device at a subsequent stage. The device at the subsequent stage is the multi-mode optical amplifier 5, the mode group permutation unit 6, or the mode multiplexer/demultiplexer 7.

The operation described above is the operation in the transmission of the first span. The same transmission configuration is also implemented for the next and subsequent spans. After transmission through a predetermined number of spans, the mode-multiplexed signal is input to the mode multiplexer/demultiplexer 7. The mode multiplexer/demultiplexer 7 converts the input mode-multiplexed signal into an output #1 to an output #M that are M single-mode optical signals. The mode multiplexer/demultiplexer 7 outputs the output #m to the receiver #m. The receiver #1 to the receiver

M convert the output #1 to the output #M, which are single-mode optical signals, into information of the original data sequence, respectively.

Second Embodiment

In the first embodiment, spatial mode permutation is performed in each of the low-order mode group and the high-order mode group. In a present embodiment, spatial mode permutation is performed between a low-order mode group and a high-order mode group.

Figure 3:
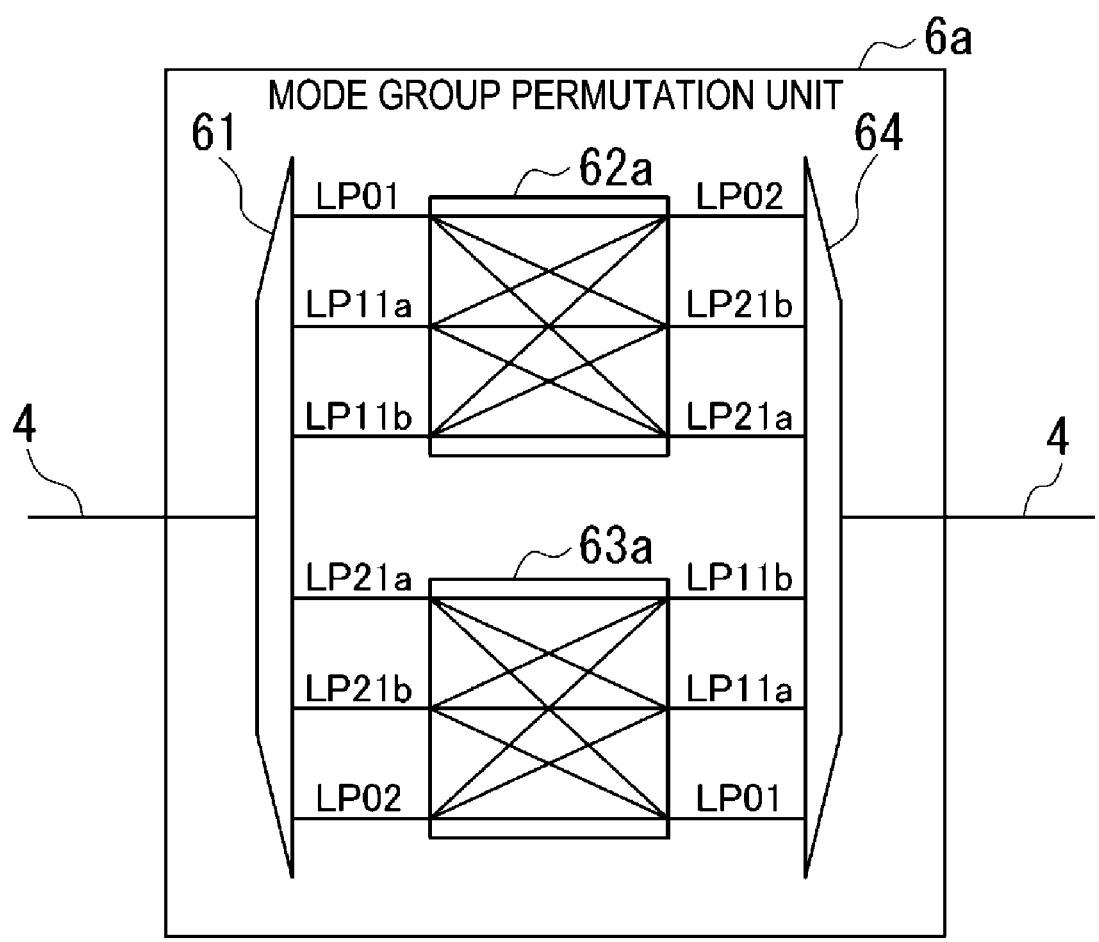
FIG. 3 is a configuration diagram of a mode group permutation unit according to a second embodiment.

A configuration of a multi-mode optical fiber system in the present embodiment is similar to the configuration of the multi-mode optical fiber system 1 in the first embodiment illustrated in FIG. 1. However, instead of the mode group permutation unit 6, a mode group permutation unit 6a illustrated in FIG. 3 is used. The mode group permutation unit 6a changes, for each mode group, an optical signal of a mode belonging to the mode group to an optical signal of another mode belonging to a mode group different from the mode group. In the present embodiment, a polarization-multiplexed mode multiplexing system is exemplified in which M is 6 as in the first embodiment and which uses a few-mode fiber for 4 LP modes. In addition, as in the first embodiment, the low-order mode group is composed of LP01, LP11a, and LP11b, and the high-order mode group is composed of LP21a, LP21b, and LP02.

FIG. 3 is a configuration diagram of the mode group permutation unit 6a according to the second embodiment of the present invention. In FIG. 3, the same portions as those of the mode group permutation unit 6 according to the first embodiment illustrated in FIG. 2 are denoted by the same reference numerals and signs, and description thereof will be omitted. The mode group permutation unit 6a includes an input-side mode multiplexer/demultiplexer 61, a first mode group permutation device 62a, a second mode group permutation device 63a, and an output-side mode multiplexer/demultiplexer 64.

The mode group permutation unit 6a uses a different mode group as a spatial mode (mode on the output side) in the next span with combinations for permutation limited to mode groups. The first mode group permutation device 62a performs given permutation from the low-order mode group to the high-order mode group. That is, the first mode group permutation device 62a performs permutation of spatial modes of the low-order mode group to different spatial modes belonging to the high-order mode group. The second mode group permutation device 63a performs given permutation from the high-order mode group to the low-order mode group. That is, the second mode group permutation device 63a performs permutation of spatial modes of the high-order mode group to different spatial modes of the low-order mode group. Thus, {LP01, LP11a, LP11b} of the low-order mode group are subjected to mode conversion and permutation in the first mode group permutation device 62a and transmitted in the next span as {LP21a, LP21b, LP02} of the high-order mode group. Similarly, {LP21a, LP21b, LP02} of the high-order mode group are subjected to mode conversion and permutation in the second mode group permutation device 63a and transmitted in the next span as {LP01, LP11a, LP11b} of the low-order mode group.

According to the present embodiment, a mode conversion process can be forcibly performed between a pair of spatial modes intrinsically having a weak coupling coefficient. As a result, it is possible to average transmission characteristic deviations between spatial modes in the mode multiplexing system.

Third Embodiment

In the second embodiment, mode group permutation equipment using a different mode group as a spatial mode (mode on the output side) in the next span with combinations for permutation limited to mode groups is disposed in the mode group permutation unit. In a third embodiment, mode group permutation equipment using a different mode group as a spatial mode (mode on the output side) in the next span with combinations for permutation limited to mode groups and further performing mode permutation using a set of a spatial mode before permutation and a spatial mode after permutation, which has a largest possible difference in propagation constant, is disposed in the mode group permutation unit.

Figure 4:
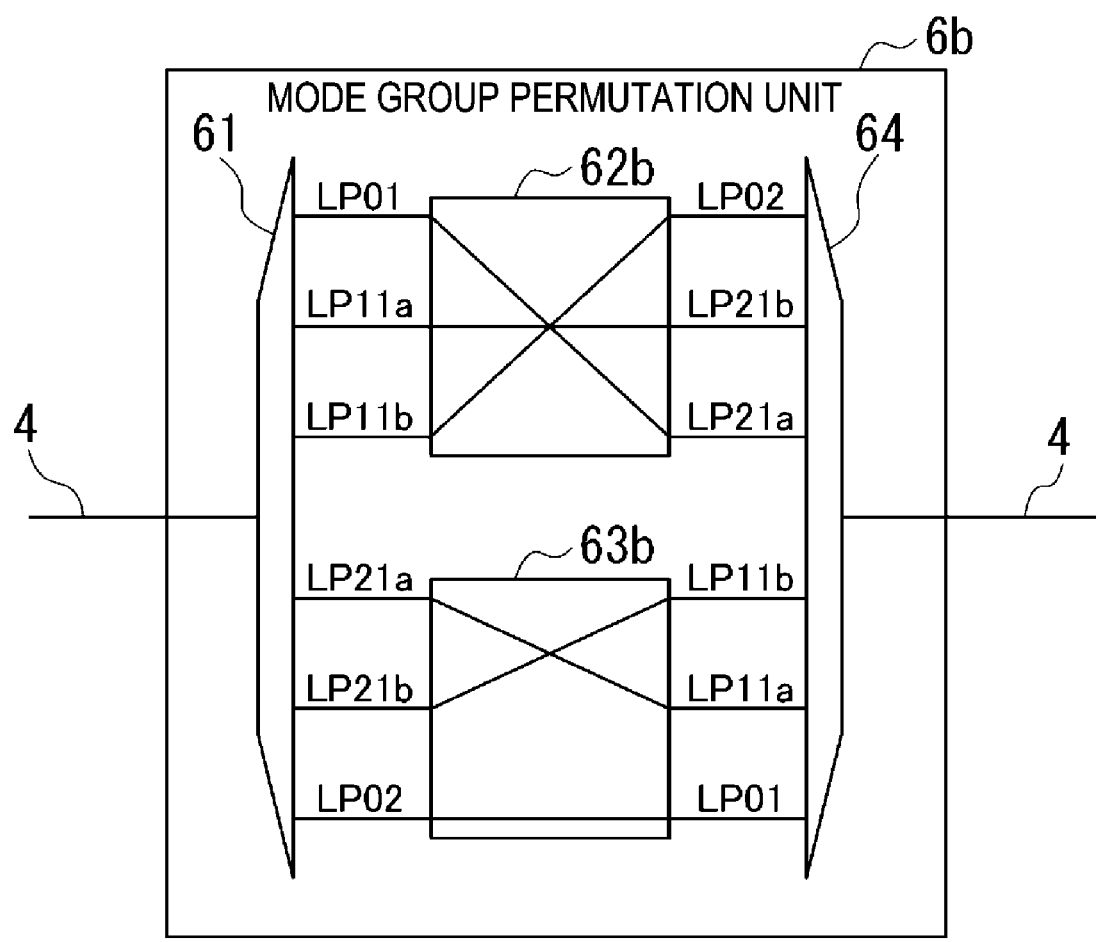
FIG. 4 is a configuration diagram of a mode group permutation unit according to a third embodiment.

A configuration of a multi-mode optical fiber system in the present embodiment is similar to the configuration of the multi-mode optical fiber system 1 in the first embodiment illustrated in FIG. 1. However, instead of the mode group permutation unit 6, a mode group permutation unit 6b illustrated in FIG. 4 is used. In the present embodiment, a polarization-multiplexed mode multiplexing system is exemplified in which M is 6 as in the first embodiment and which uses a few-mode fiber for 4 LP modes. In addition, as in the first embodiment, the low-order mode group is composed of LP01, LP11a, and LP11b, and the high-order mode group is composed of LP21a, LP21b, and LP02.

FIG. 4 is a configuration diagram of the mode group permutation unit 6b according to the third embodiment of the present invention. In FIG. 4, the same portions as those of the mode group permutation unit 6 according to the first embodiment illustrated in FIG. 2 are denoted by the same reference numerals and signs, and description thereof will be omitted. The mode group permutation unit 6b includes an input-side mode multiplexer/demultiplexer 61, a first mode group permutation device 62b, a second mode group permutation device 63b, and an output-side mode multiplexer/demultiplexer 64.

For convenience of notation, LP01, LP11a, LP11b, LP21a, LP21b, and LP02 are designated as modes 1, 2, 3, 4, 5, and 6, respectively, and permutation of the first mode group permutation device 62b is represented by σ and permutation of the second mode group permutation device 63b is represented by τ. At this time, σ and τ are determined using a propagation constant $\beta_i$ in a mode i as in the following Equation (1) and Equation (2). Note that argmax indicates a set of variables that maximize the function.

[Math. 1]

$$\sigma = \underset{\sigma \in \{4,5,6\}}{\mathrm{argmax}} \sum_{i=1}^{3} |\beta_i - \beta_{\sigma(i)}| \quad (1)$$

[Math. 2]

$$\tau = \underset{\tau \in \{1,2,3\}}{\mathrm{argmax}} \sum_{i=4}^{6} |\beta_i - \beta_{\tau(i)}| \quad (2)$$

In the example of FIG. 4, the first mode group permutation device 62b and the second mode group permutation device 63b do not perform given mode permutation, the first mode group permutation device 62b performs the permutation σ represented by Equation (3), and the second mode group permutation device 63b performs the permutation τ represented by Equation (4).

[Math. 3]
$$\sigma = \begin{pmatrix} 1 & 2 & 3 \\ 4 & 5 & 6 \end{pmatrix} \quad (3)$$

[Math. 4]
$$\tau = \begin{pmatrix} 4 & 5 & 6 \\ 2 & 3 & 1 \end{pmatrix} \quad (4)$$

As a result, the low-order mode and the high-order mode can be efficiently converted, thereby greatly suppressing the transmission characteristic deviation for each spatial mode. In addition, in the example of FIG. 4, the mode permutation is performed as cyclic permutation, and thus it is expected to further increase an effect of suppressing the transmission characteristic deviation described above.

A transmission experiment using a few-mode fiber for 4 LP modes was conducted to demonstrate the effect of the invention. For long-distance transmission, a circled transmission system was set up, and independent 6 optical signals were placed on the spatial modes of LP01, LP11a, LP11b, LP21a, LP21b, LP02 and transmitted. The related-art transmission in which the mode conversion processing was not performed and the transmission in which the mode group permutation unit 6b of the third embodiment illustrated in FIG. 4 performed the mode group permutation were compared.

Figure 5A:
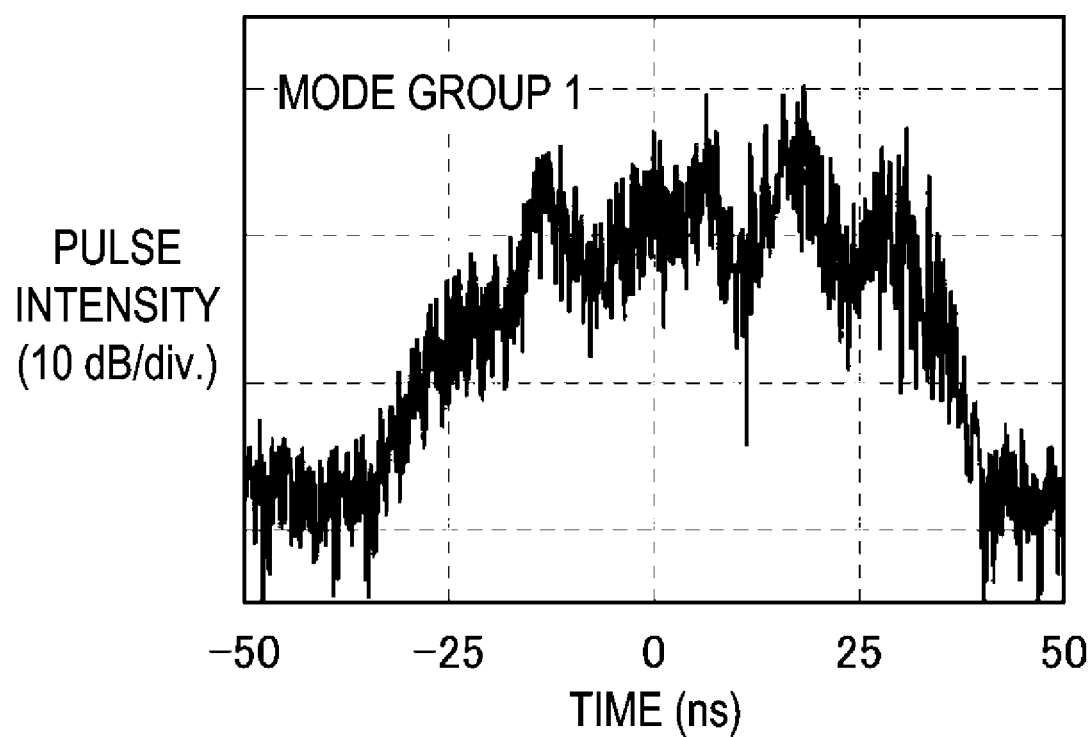
FIG. 5A is a diagram illustrating pulse broadening when related-art transmission is used.
Figure 5B:
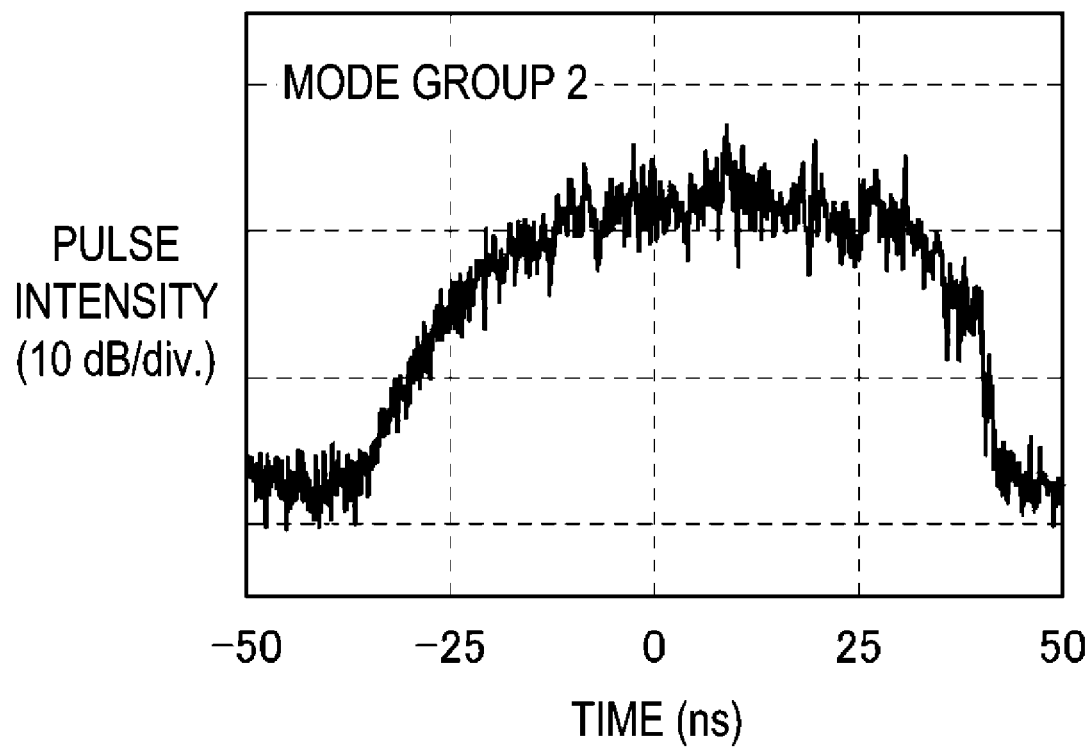
FIG. 5B is a diagram illustrating pulse broadening when the related-art transmission is used.
Figure 5C:
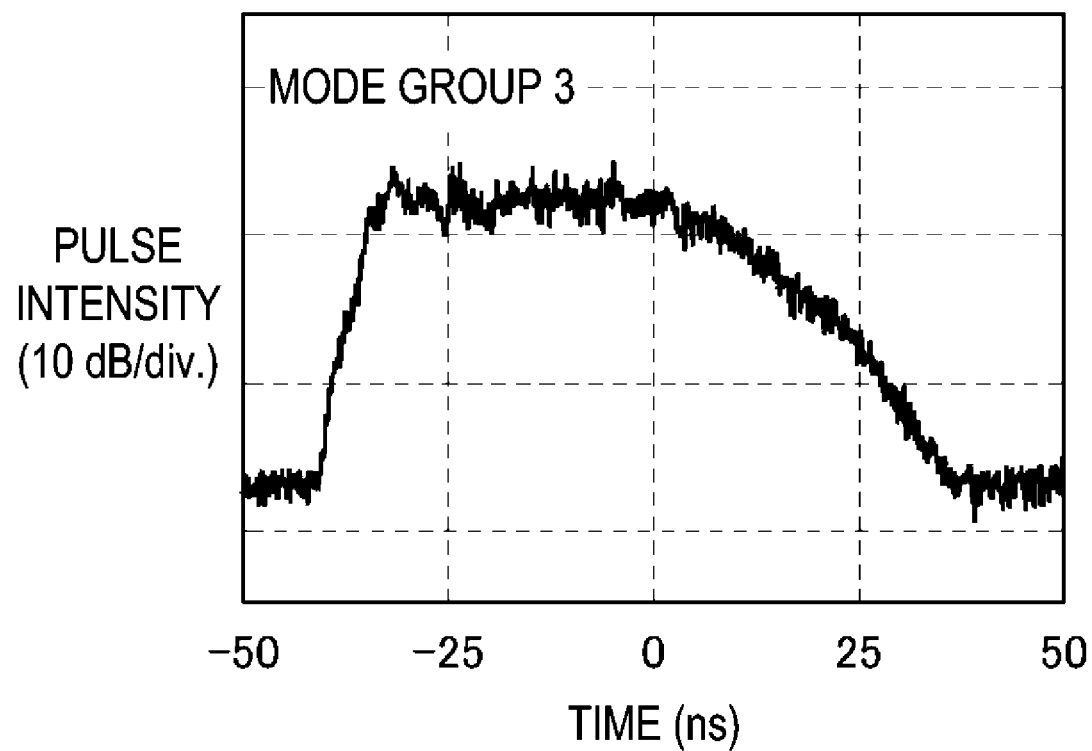
FIG. 5C is a diagram illustrating pulse broadening when the related-art transmission is used.

FIG. 5A, FIG. 5B, and FIG. 5C are diagrams each showing a pulse broadening due to mode dispersion after 1162 km transmission when the related-art transmission was used. FIG. 5A shows the mode group 1, FIG. 5B shows the mode group 2, and FIG. 5C shows the mode group 3. Due to presence of high-order modes, an influence of mode dispersion is significant, as shown in these drawings. When the pulse broadening is defined as a window width of 20 decibels (dB), it can be seen that the pulse broadens over 50 ns or more.

Figure 6A:
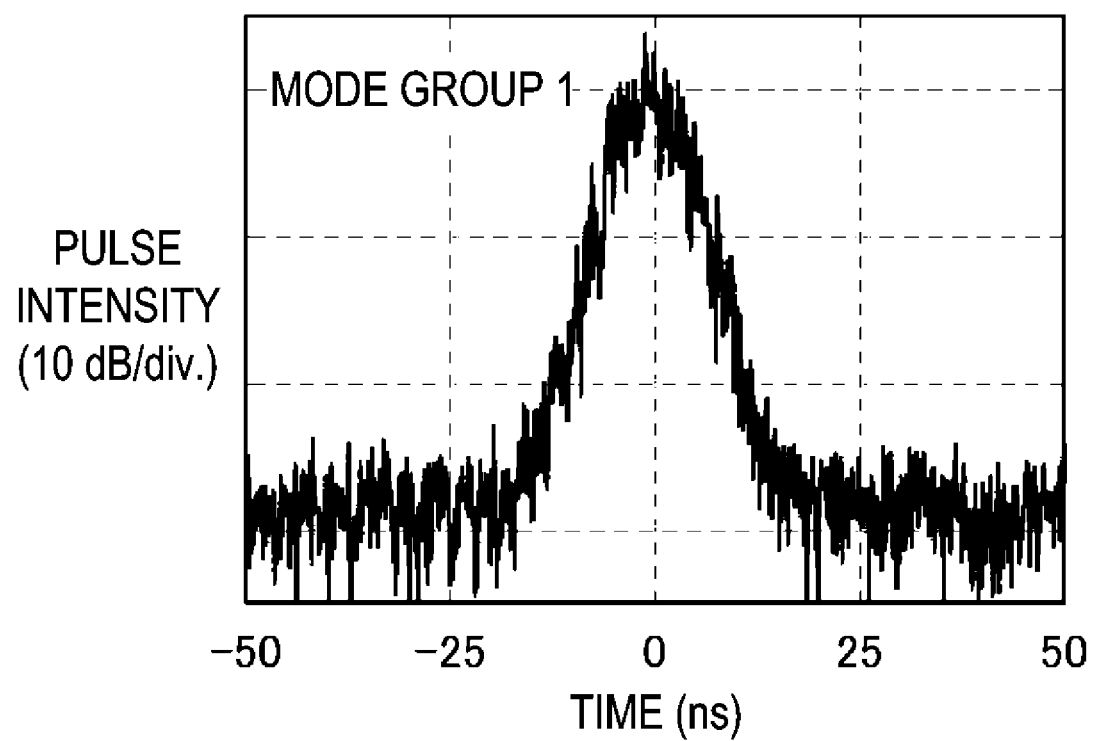
FIG. 6A is a diagram illustrating pulse broadening of transmission using the third embodiment.
Figure 6B:
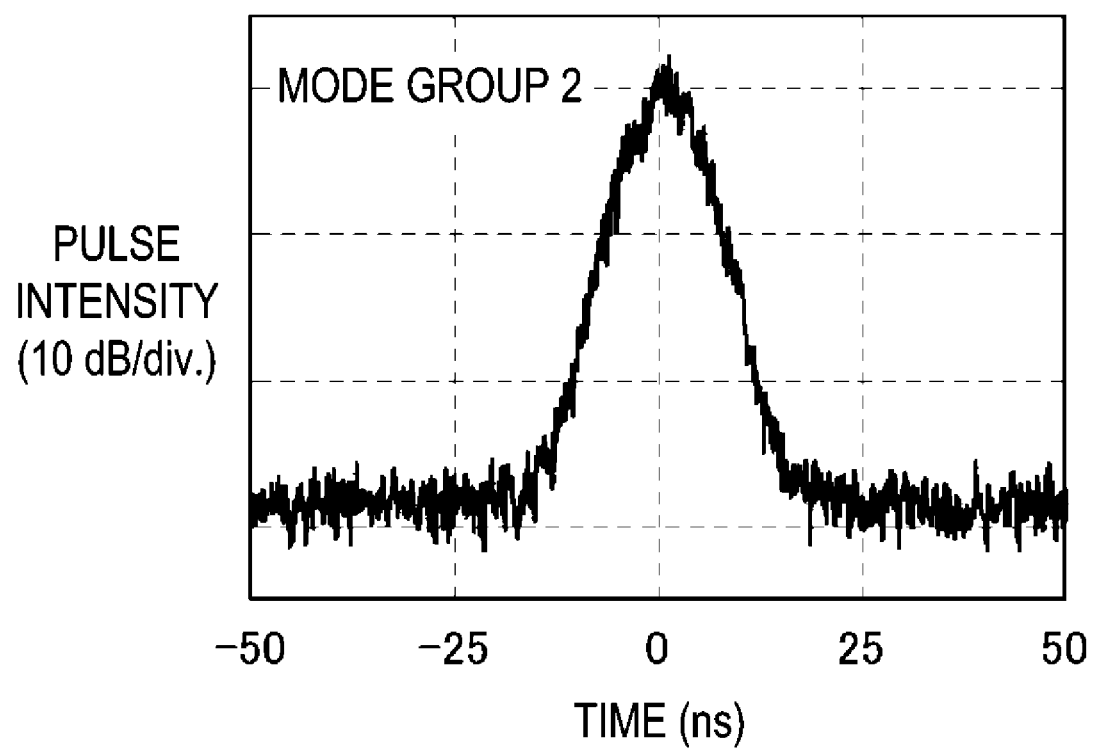
FIG. 6B is a diagram illustrating pulse broadening of the transmission using the third embodiment.
Figure 6C:
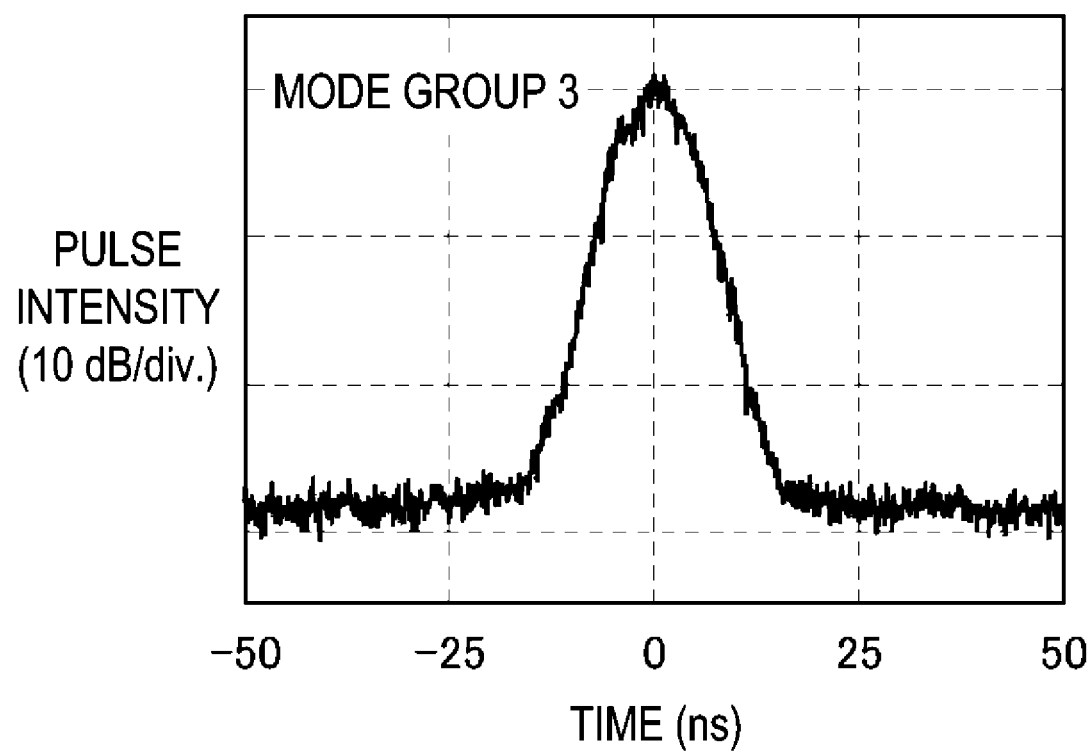
FIG. 6C is a diagram illustrating pulse broadening of the transmission using the third embodiment.

On the other hand, FIG. 6A, FIG. 6B, and FIG. 6C are diagrams each showing a pulse broadening due to mode dispersion after 1162 km transmission when the third embodiment was used. FIG. 6A shows the mode group 1, FIG. 6B shows the mode group 2, and FIG. 6C shows the mode group 3. In these drawings, it can be seen that the pulse broadening is suppressed to approximately 20 ns. In this way, in the present embodiment, an effect of compressing the pulse broadening due to the mode group permutation is significant.

Figure 7:
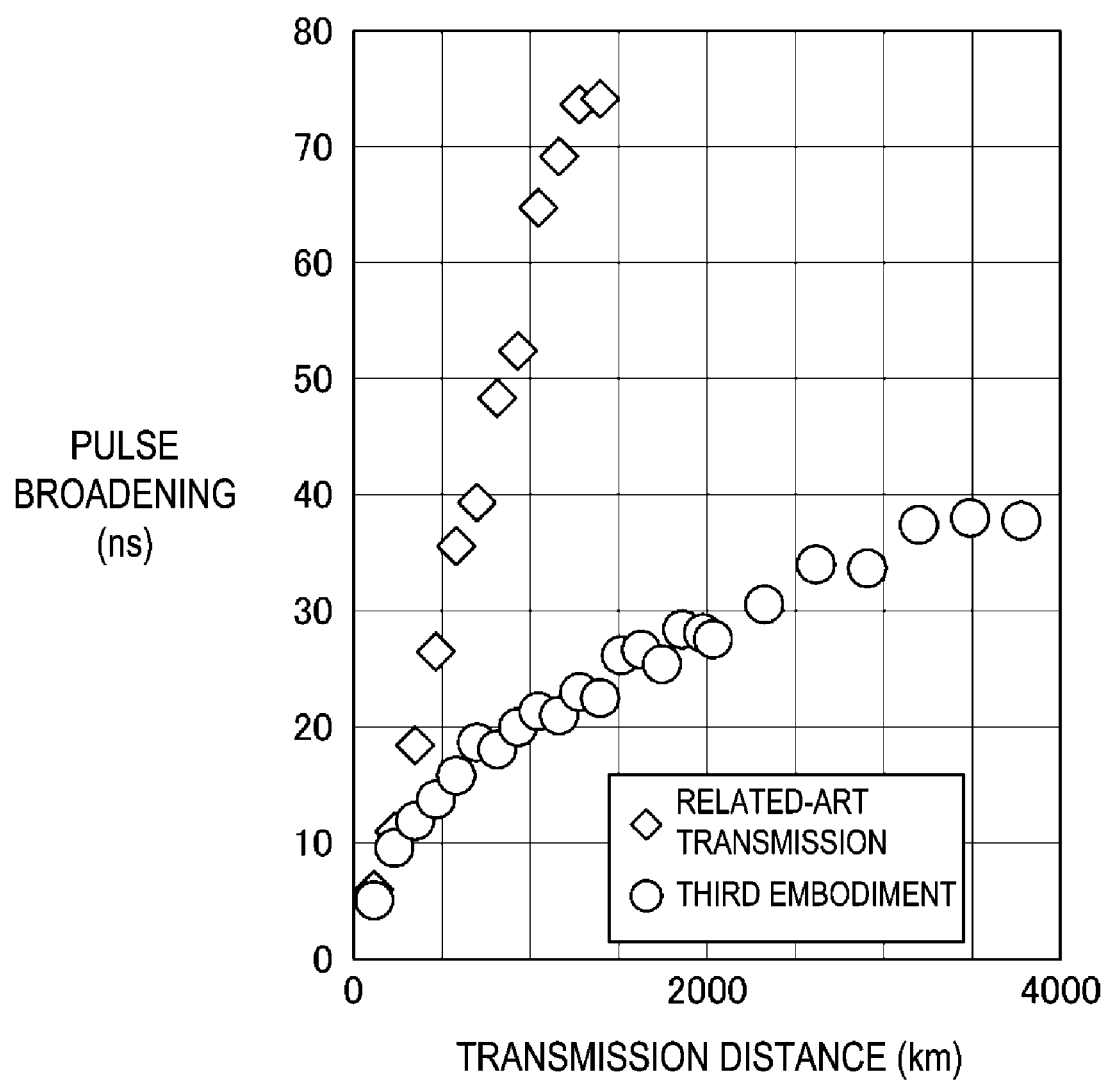
FIG. 7 is a diagram in which the pulse broadening of the third embodiment and the pulse broadening of the related-art transmission are compared.

FIG. 7 is a diagram in which the pulse broadening of the related-art transmission and the pulse broadening of the mode group permutation unit 6b of the third embodiment are compared. In the related-art transmission, the pulse broadening increases generally linearly as a function of a distance. In contrast, in the third embodiment, the pulse broadening is greatly reduced, and a pulse broadening reduction effect of 70% or greater can be confirmed when the transmission distance is 1000 km or longer.

According to the embodiments described above, it is possible to reduce the influence of mode dispersion in the mode-multiplexed transmission of optical signals and to reduce information errors of the optical signals transmitted through transmission lines.

According to the embodiments described above, the optical transmission system includes a plurality of transmission lines through which a mode-multiplexed signal obtained by multiplexing a plurality of optical signals of different types of modes is transmitted, and one or more mode group permutation units provided between the plurality of transmission lines. Each of the one or more mode group permutation units changes, on a mode-group-by-mode-group basis, an optical signal of a mode belonging to a mode group to an optical signal of another mode belonging to a mode group after permutation corresponding to the mode group in such a manner that the modes are interchanged between at least some of the plurality of optical signals multiplexed into the mode-multiplexed signal input from one of the plurality of transmission lines on an input side, and outputs the mode-multiplexed signal after mode interchange to one of the plurality of transmission lines on an output side. Each of the mode groups is, for example, a low-order mode group including low-order modes, or a high-order mode group including high-order modes.

The mode group before permutation and the mode group after permutation corresponding to the mode group before permutation may be identical. That is, for each mode group, the mode group permutation unit interchanges the modes between at least some of the optical signals of modes belonging to the mode group. In this way, for each mode group, the mode group permutation unit changes an optical signal of a mode belonging to the mode group to an optical signal of another mode belonging to the mode group.

Furthermore, the mode group before permutation and the mode group after permutation corresponding to the mode group before permutation may be different. That is, the mode group permutation unit changes, for each mode group, an optical signal of a mode belonging to the mode group to an optical signal of another mode belonging to a mode group different from the mode group.

Furthermore, a mode group before permutation and a mode group after permutation corresponding to the mode group may be different from each other, and a mode before change and a mode after change may constitute a combination having a large difference in propagation constant. That is, for each mode group, the mode group permutation unit may change an optical signal of a mode belonging to the mode group to an optical signal of another mode belonging to a mode group different from the mode group and having a large difference in propagation constant from the mode of the optical signal. For example, a set of a mode before change and a mode after change is determined such that the difference in propagation constant is maximized.

The mode group permutation unit may include a mode demultiplexer, mode group permutation devices corresponding to a plurality of mode groups, and a mode multiplexer. For example, the mode demultiplexer is the input-side mode multiplexer/demultiplexer 61 of the embodiments, the mode group permutation devices are the first mode group permutation devices 62, 62a, 62b and the second mode group permutation devices 63, 63a, 63b of the embodiments, and the mode multiplexer is the output-side mode multiplexer/demultiplexer 64. The mode demultiplexer separates optical signals of a plurality of types of modes multiplexed into a mode-multiplexed signal input from the transmission line on the input side. Each of the mode group permutation devices receives, from the mode demultiplexer, optical signals of modes belonging to a mode group before permutation corresponding to the mode group permutation device, changes modes of at least some of the received optical signals to another mode belonging to a mode group after permutation corresponding to the mode group permutation device, and outputs the optical signals of the changed mode to the mode multiplexer.

Although embodiments of the present invention have been described above in detail with reference to the drawings, the specific configurations thereof are not limited to those of the embodiments and also include designs or the like without departing from the spirit of the present invention.

REFERENCE SIGNS LIST

1 Multi-mode optical fiber system
2 Transmitter
3 Mode multiplexer/demultiplexer
4 Multi-mode fiber
5 Multi-mode optical amplifier
6 Mode group permutation unit
6a Mode group permutation unit
6b Mode group permutation unit
7 Mode multiplexer/demultiplexer
8 Receiver
61 Input-side mode multiplexer/demultiplexer
62 First mode group permutation device
62a First mode group permutation device
62b First mode group permutation device
63 Second mode group permutation device
63a Second mode group permutation device
63b Second mode group permutation device
64 Output-side mode multiplexer/demultiplexer

The invention claimed is:

1. An optical transmission system comprising:
a plurality of transmission lines through which a mode-multiplexed signal obtained by multiplexing a plurality of optical signals of different types of modes is transmitted; and
one or more mode group permutation units provided between the plurality of transmission lines, wherein
each of the one or more mode group permutation units changes, on a mode-group-by-mode-group basis, an optical signal of a mode belonging to a mode group to an optical signal of another mode belonging to a mode group after permutation corresponding to the mode group in such a manner that the modes are interchanged between at least some of the plurality of optical signals multiplexed into the mode-multiplexed signal input from one of the plurality of transmission lines on an input side, and outputs the mode-multiplexed signal after mode interchange to one of the plurality of transmission lines on an output side,
at least one of the one or more mode group permutation unit includes:
a mode demultiplexer configured to separate the optical signals of a plurality of types of modes multiplexed into the mode-multiplexed signal input from the transmission line on the input side,
mode group permutation devices corresponding to a plurality of mode groups, and
a mode multiplexer configured to output a mode-multiplexed signal obtained by multiplexing the optical signals of a single mode output from the mode group permutation devices corresponding to the plurality of mode groups to the transmission line on the output side, and
each of the mode group permutation devices receives, from the mode demultiplexer, the optical signals of modes belonging to the mode group before permutation corresponding to the mode group permutation device, changes a mode of at least some of the received optical signals to another mode belonging to a mode group after permutation corresponding to the mode group permutation device, and outputs the optical signals after mode change to the mode multiplexer.

2. The optical transmission system according to claim 1, wherein
the mode group before permutation and the mode group after permutation corresponding to the mode group before permutation are identical.

3. The optical transmission system according to claim 1, wherein
the mode group before permutation and the mode group after permutation corresponding to the mode group before permutation are different.

4. The optical transmission system according to claim 1, wherein
the mode group before permutation and the mode group after permutation corresponding to the mode group before permutation are different, and the mode before change and the mode after change constitute a combination having a large difference in propagation constant.

5. The optical transmission system according to claim 1, wherein
each of the mode groups is a first order mode group including a mode of a first order mode or a second order mode group higher than the first-order mode group including a mode of a second order mode higher than the first-order mode.

6. An optical transmission apparatus comprising:
a mode group permutation unit configured to receive a mode-multiplexed signal obtained by multiplexing a plurality of optical signals of different types of modes from a transmission line on an input side, changes, on a mode-group-by-mode-group basis, an optical signal of a mode belonging to a mode group to an optical signal of another mode belonging to a mode group after permutation corresponding to the mode group in such a manner that the modes are interchanged between at least some of the plurality of optical signals multiplexed into the received mode-multiplexed signal, and outputs the mode-multiplexed signal after mode interchange to a transmission line on an output side,
wherein the mode group permutation unit includes:
a mode demultiplexer configured to separate the optical signals of a plurality of types of modes multiplexed into the mode-multiplexed signal input from the transmission line on the input side,
mode group permutation devices corresponding to a plurality of mode groups, and
a mode multiplexer configured to output a mode-multiplexed signal obtained by multiplexing the optical signals of a single mode output from the mode group permutation devices corresponding to the plurality of mode groups to the transmission line on the output side, and
each of the mode group permutation devices receives, from the mode demultiplexer, the optical signals of modes belonging to the mode group before permutation corresponding to the mode group permutation device, changes a mode of at least some of the received optical signals to another mode belonging to a mode group after permutation corresponding to the mode group permutation device, and outputs the optical signals after mode change to the mode multiplexer.

7. An optical transmission method in an optical transmission system including a plurality of transmission lines through which a mode-multiplexed signal obtained by multiplexing a plurality of optical signals of different types of modes is transmitted, and one or more mode group permutation units provided between the plurality of transmission lines, the optical transmission method comprising:

by each of the one or more mode group permutation units, changing, on a mode-group-by-mode-group basis, an optical signal of a mode belonging to a mode group to an optical signal of another mode belonging to a mode group after permutation corresponding to the mode group in such a manner that the modes are interchanged between at least some of the plurality of optical signals multiplexed into the mode-multiplexed signal input from one of the plurality of transmission lines on an input side, and outputting the mode-multiplexed signal after mode interchange to one of the plurality of transmission lines on an output side including:

separating the optical signals of the plurality of types of modes multiplexed into the mode-multiplexed signal input from the transmission line on the input side, and outputting a mode-multiplexed signal obtained by multiplexing the optical signals of a single mode output from mode group permutation devices corresponding to a plurality of mode groups to the transmission line on the output side, and receiving the optical signals of modes belonging to the mode group before permutation corresponding to the mode group permutation device and changing a mode of at least some of the received optical signals to another mode belonging to a mode group after permutation corresponding to the mode group permutation device, and outputting the optical signals after mode change.

\* \* \* \* \*